No. 714,484. Patented Nov. 25, 1902.
H. VON HOCHSTETTER.
PROCESS OF MAKING ACIDS OF THE FATTY ACID SERIES.
(Application filed Mar. 7, 1902.)
(No Model.)
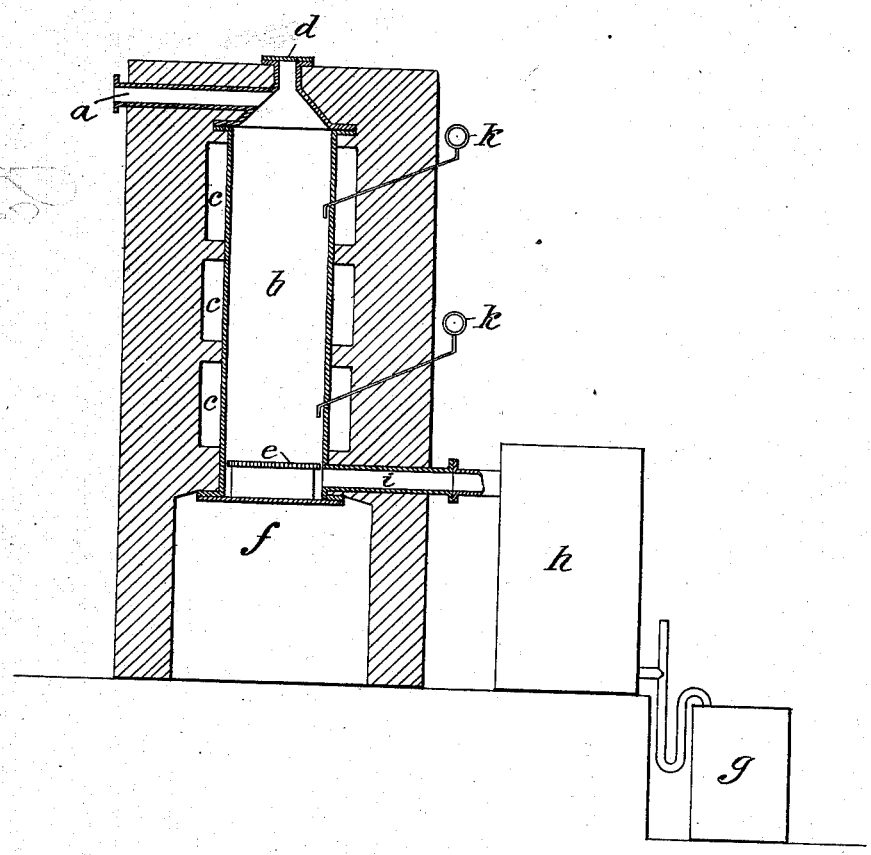
Witnesses:
Albert Young
Emily Balharry
Inventor:
H. von Hochstetter
by Fairfax & Wetter
Attorneys

UNITED STATES PATENT OFFICE.

HEINRICH VON HOCHSTETTER, OF TROPPAU, AUSTRIA-HUNGARY.

PROCESS OF MAKING ACIDS OF THE FATTY-ACID SERIES.

SPECIFICATION forming part of Letters Patent No. 714,484, dated November 25, 1902.

Application filed March 7, 1902. Serial No. 97,181. (No specimens.)

*To all whom it may concern:*

Be it known that I, HEINRICH VON HOCHSTETTER, manufacturing chemist, a subject of the Emperor of Austria-Hungary, residing at Troppau, Austria-Hungary, have invented certain new and useful Improvements in the Manufacture of Acetic Acid and other Acids of the Fatty-Acid Series, of which the following is a specification.

The usual method of obtaining acetic acid from its salts on a commercial scale consists in decomposing acetate of lime by means of strong sulfuric acid in a heated retort or boiler provided with an agitator. This method has the defect that it subjects the apparatus to rapid wear and tear and that the yield of acid remains considerably below the theoretical yield, owing to inevitable waste through secondary reactions, especially the formation of acetone. The tarry matter contained in the raw material (pyrolignate of lime) when subjected to the required high temperature of distillation exerts a reducing action on the sulfuric acid, of which a large excess has to be employed while forming considerable quantities of sulfurous acid. These defects cannot be completely avoided even by distilling *in vacuo*.

The present invention relates to an intermittent process of manufacture in which dry hydrochloric-acid gas is caused to flow over acetate of lime at a temperature but slightly exceeding the boiling-point of acetic acid. The hydrochloric-acid gas when in a dry condition rapidly penetrates the entire mass of porous pyrolignate of lime while liberating acetic acid in a concentrated condition which distils off and contains very little impurities. The quantity obtained is almost equal to the theoretical yield. As residue there remains perfectly-dry calcium chlorid, which in this form constitutes a valuable by-product. The temperature can be easily regulated in such a manner that it remains above the boiling-point of acetic acid during the process of decomposition. The dry hydrochloric acid can be obtained in the known manner by causing liquid hydrochloric acid to flow into concentrated sulfuric acid and drying the gas thus liberated. Another suitable source of supply are the gases produced in the manufacture of sulfate of soda, the said gases being also dried for this purpose by causing them to pass through coke-towers supplied with concentrated sulfuric acid.

The latter method of working is easily practicable in conjunction with a sulfate factory, because the sulfuric acid flowing out of the coke-towers may be used again for the decomposition of common salt.

The process may be carried out in the apparatus, of which the accompanying drawing is a sectional elevation. It consists, chiefly, of an upright cylindrical receptacle or retort $b$, which contains the pyrolignate of lime in the shape of lumps, and to which the hot acid gas is supplied at the top through the tube $a$. The gases then descend through the charge of pyrolignate of lime while liberating its acetic acid, which then passes through the strainer $e$ and tube $i$ into the condenser $h$, whence the acetic acid flows into the receiver $g$. When the acetic acid has been completely driven out, the detachable bottom of the cylinder $b$ is removed, the cylinder is emptied, and subsequently filled with a fresh charge of pyrolignate through the feed-opening $d$. The retort $b$ is heated by means of hot gas passing through the heating-flues $c$, which surround the retort, and the temperature of the interior is indicated by suitable thermometers $k$.

Instead of hydrochloric-acid gas other mineral-acid gas—for instance, the sulfurous acid gas given off by pyrites burners—may be used for decomposing the acetate of lime.

If sulfurous acid gas in the presence of the quantity of moisture required for forming $H_2SO_3$ is conducted over heated pyrolignate of lime, the latter will be decomposed while forming concentrated acetic acid, which distils off. At the same time a dry residue is obtained, which owing to its high percentage of sulfite is directly applicable to certain manufactures.

The process described above is commercially applicable also for obtaining other fatty acids from their salts. The process runs smoothly and yields a high percentage of acid. The acid obtained is very fine, while the solid residue is dry and forms a valuable by-product.

What I claim as my invention, and desire to secure by Letters Patent, is—

1. The process for obtaining acids of the fatty-acid series from their salts, by means of mineral acids, which consists in causing the latter to pass in a dry gaseous state over the said salts at a temperature exceeding the boiling-point of the acid to be obtained, substantially as described.

2. The process for obtaining acetic acid from acetate of lime by means of a mineral acid, which consists in causing a dry gaseous mineral acid to pass over acetate of lime at a temperature exceeding the boiling-point of acetic acid, substantially as described.

3. The process for obtaining acetic acid from acetate of lime, which consists in causing dry hydrochloric-acid gas to pass over acetate of lime at a temperature exceeding the boiling-point of acetic acid, substantially as described.

In testimony whereof I have hereunto set my hand in presence of two subscribing witnesses.

HEINRICH VON HOCHSTETTER.

Witnesses:
CARL CINNIG,
SEBASTIAN NEUBRAND.